(12) United States Patent
Kuwayama et al.

(10) Patent No.: US 8,678,963 B2
(45) Date of Patent: Mar. 25, 2014

(54) BICYCLE FRONT DERAILLEUR

(75) Inventors: Kazuya Kuwayama, Osaka (JP); Kenkichi Inoue, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 240 days.

(21) Appl. No.: 13/238,345

(22) Filed: Sep. 21, 2011

(65) Prior Publication Data

US 2013/0072333 A1 Mar. 21, 2013

(51) Int. Cl.
*F16H 9/00* (2006.01)
*F16H 59/00* (2006.01)
*F16H 61/00* (2006.01)
*F16H 63/00* (2006.01)

(52) U.S. Cl.
USPC ............................................. 474/80; 474/82

(58) Field of Classification Search
USPC ...................................................... 474/80, 82
See application file for complete search history.

(56) References Cited

U.S. PATENT DOCUMENTS

| | | | | | |
|---|---|---|---|---|---|
| 2,187,368 | A | * | 1/1940 | Todrys | 474/80 |
| 2,693,116 | A | * | 11/1954 | Juy | 474/80 |
| 3,910,136 | A | * | 10/1975 | Juy | 474/144 |
| 4,027,542 | A | * | 6/1977 | Nagano | 474/82 |
| 4,106,356 | A | * | 8/1978 | Nagano et al. | 474/82 |
| 4,198,873 | A | * | 4/1980 | Nagano et al. | 474/82 |
| 4,229,987 | A | * | 10/1980 | Fujimoto | 474/82 |
| 4,279,172 | A | * | 7/1981 | Nagano et al. | 474/82 |
| 4,322,209 | A | * | 3/1982 | Shimano | 474/82 |
| 4,343,613 | A | * | 8/1982 | Leiter et al. | 474/82 |
| 4,362,523 | A | * | 12/1982 | Huret | 474/82 |
| 4,384,864 | A | * | 5/1983 | Bonnard | 474/82 |
| 4,443,208 | A | * | 4/1984 | Kozakae | 474/82 |
| 4,507,101 | A | * | 3/1985 | Nagano | 474/82 |
| 4,516,961 | A | * | 5/1985 | Coue | 474/80 |
| 4,530,677 | A | * | 7/1985 | Nagano | 474/80 |
| 4,586,913 | A | * | 5/1986 | Nagano | 474/80 |
| 4,604,078 | A | * | 8/1986 | Nagano | 474/80 |
| 4,610,644 | A | * | 9/1986 | Nagano | 474/82 |
| 4,642,072 | A | * | 2/1987 | Nagano | 474/82 |
| 4,832,662 | A | * | 5/1989 | Nagano | 474/80 |

(Continued)

FOREIGN PATENT DOCUMENTS

EP 1447317 A2 8/2004
FR 2621373 A1 4/1989

OTHER PUBLICATIONS

European Search Report of corresponding EP Application No. 12 18 2142.5 dated Dec. 20, 2012.

*Primary Examiner* — William A Rivera
*Assistant Examiner* — Henry Liu
(74) *Attorney, Agent, or Firm* — Global IP Counselors

(57) ABSTRACT

A bicycle front derailleur is basically provided with a base member, a movable member and a biasing arrangement. The biasing arrangement is operatively disposed between the base member and the movable member such that a biasing force of the biasing arrangement is smaller during an early range of a movement range of the movable member as the movable member moves from a first position to a second position. The biasing arrangement includes a first biasing member, a second biasing member and a pre-load body. The first and second biasing members selectively bias the movable member. The pre-load body maintains the second biasing member in a loaded state such that the second biasing member applies the second biasing force only after the movable member has partially moved from the first position towards the second position.

9 Claims, 13 Drawing Sheets

(56) References Cited

U.S. PATENT DOCUMENTS

| | | | |
|---|---|---|---|
| 4,878,884 A * | 11/1989 | Romano | 474/82 |
| 4,887,990 A * | 12/1989 | Bonnard et al. | 474/78 |
| 5,037,355 A * | 8/1991 | Kobayashi | 474/82 |
| 5,104,358 A * | 4/1992 | Kobayashi | 474/82 |
| 5,389,043 A * | 2/1995 | Hsu | 474/80 |
| 5,695,421 A * | 12/1997 | Fukuda | 474/82 |
| 5,860,880 A * | 1/1999 | Oka | 474/77 |
| 5,897,451 A * | 4/1999 | Ichida | 474/82 |
| 6,093,122 A * | 7/2000 | McLaughlin et al. | 474/82 |
| 7,527,571 B2 * | 5/2009 | Shahana | 474/82 |
| 7,677,998 B2 * | 3/2010 | Tetsuka | 474/82 |
| 7,762,916 B2 * | 7/2010 | Ichida et al. | 474/82 |
| RE41,782 E * | 9/2010 | Fukuda | 474/82 |
| 8,057,332 B2 * | 11/2011 | Takachi et al. | 474/80 |
| 2005/0187050 A1 * | 8/2005 | Fukuda | 474/80 |
| 2007/0191159 A1 * | 8/2007 | Fukuda | 474/82 |
| 2012/0157250 A1 * | 6/2012 | Jordan | 474/80 |

* cited by examiner

BICYCLE FRONT DERAILLEUR

BACKGROUND

1. Field of the Invention

This invention generally relates to a bicycle front derailleur. More specifically, the present invention relates to a bicycle front derailleur having a biasing arrangement operatively disposed between a base member and a movable member that regulates the operating force for shifting the movable member.

2. Background Information

Generally, a front derailleur is mounted to the bicycle frame adjacent to the front chain rings to shift a chain laterally between the front chain rings. A front derailleur includes a fixed or base member that is non-movably secured to the bicycle frame, and a movable member. The movable member includes a chain guide that is movably supported relative to the fixed member to move between at least two lateral shift positions. Typically, a linkage assembly is coupled between the fixed member and the movable member in order to movably support the movable member with the chain guide. The chain guide typically has a pair of cage plates or guide plates arranged to selectively contact and move the chain between the front chain rings. The chain guide is usually moved relative to the base member against a biasing force of a spring by pulling and/or releasing a shifter control cable that is coupled between a shifter and the front derailleur. The control cable is often connected to one of the pivotal links to apply a torque thereto in order to move the chain guide between an extended position and a retracted position. Two examples of cable operated front derailleurs are disclosed in U.S. Pat. Nos. 6,093,122 and 7,081,058.

SUMMARY

One aspect presented in this disclosure is to provide a bicycle front derailleur in which operating force is smaller during an early range of a movement range of bicycle front derailleur.

In accordance with one aspect of the present disclosure, a bicycle front derailleur is basically provided with a base member, a movable member and a biasing arrangement. The base member includes a bicycle mounting portion. The movable member is movably supported to the base member between a first position and a second position respect to the base member. The biasing arrangement is operatively disposed between the base member and the movable member such that the biasing arrangement biases the movable member towards a first direction and maintains the movable member in the first position. The biasing arrangement includes a first biasing member, a second biasing member and a pre-load body. The first biasing member applies a first biasing force that biases the movable member towards the first direction at least while the movable member is in the first position. The second biasing member applies a second biasing force that biases the movable member towards the first direction. The pre-load body maintains the second biasing member in a loaded state such that the second biasing member applies the second biasing force only after the movable member has moved from the first position towards the second position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
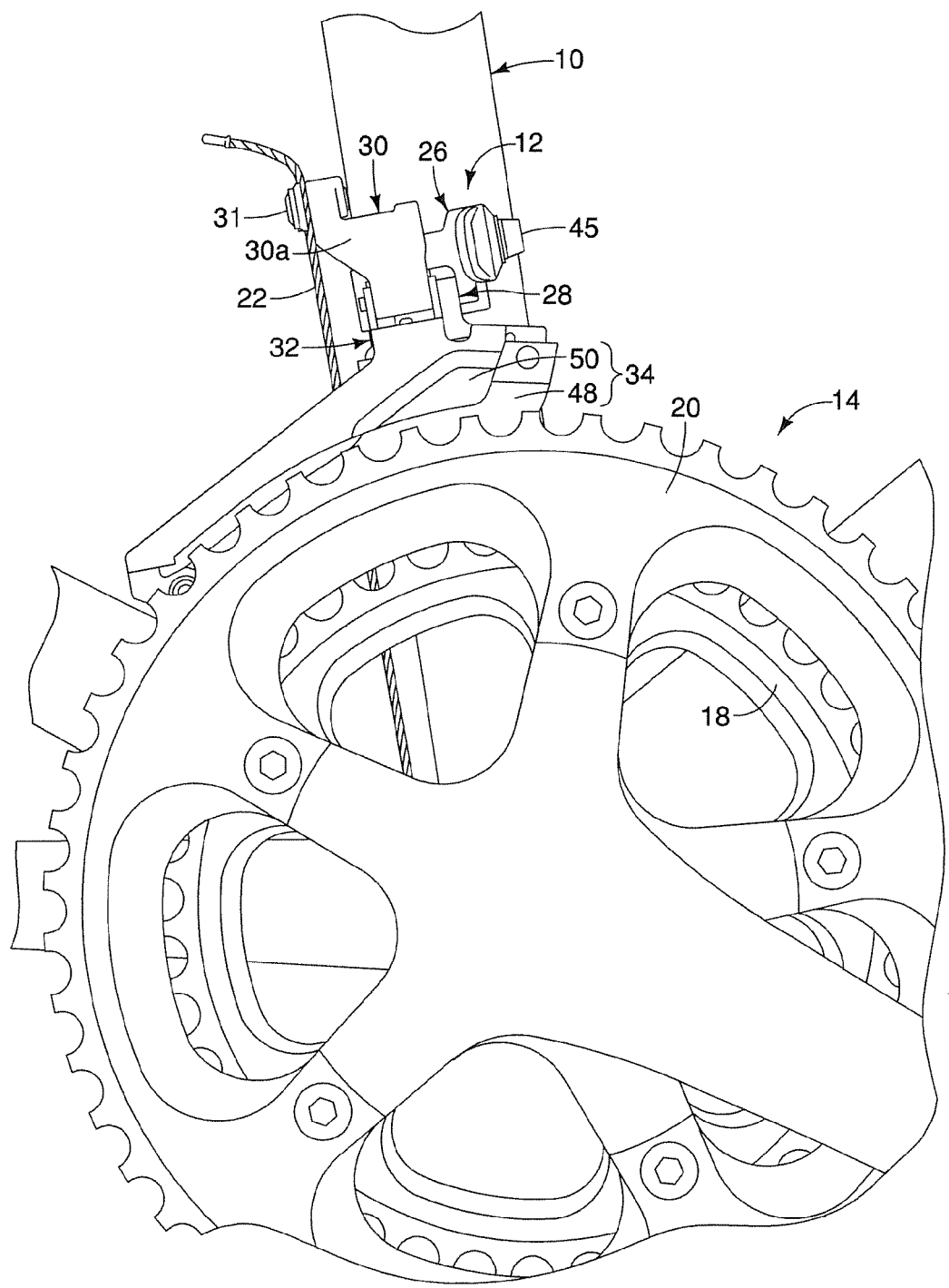
FIG. 1 is a partial side elevational view of a bicycle with a front derailleur mounted thereto in accordance with a first illustrated embodiment.
Figure 2:
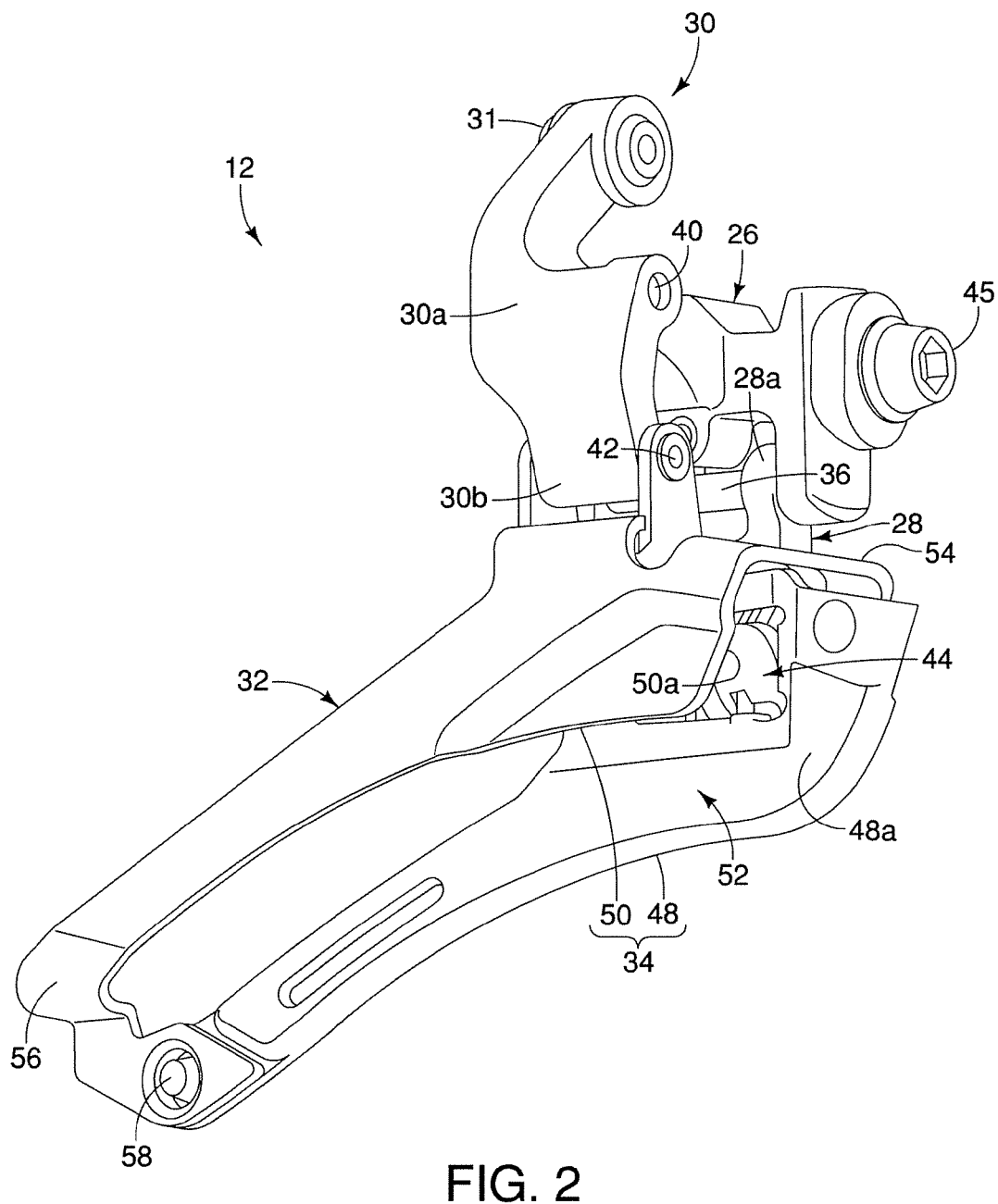
FIG. 2 is an outside perspective view of the front derailleur illustrated in FIG. 1.
Figure 3:
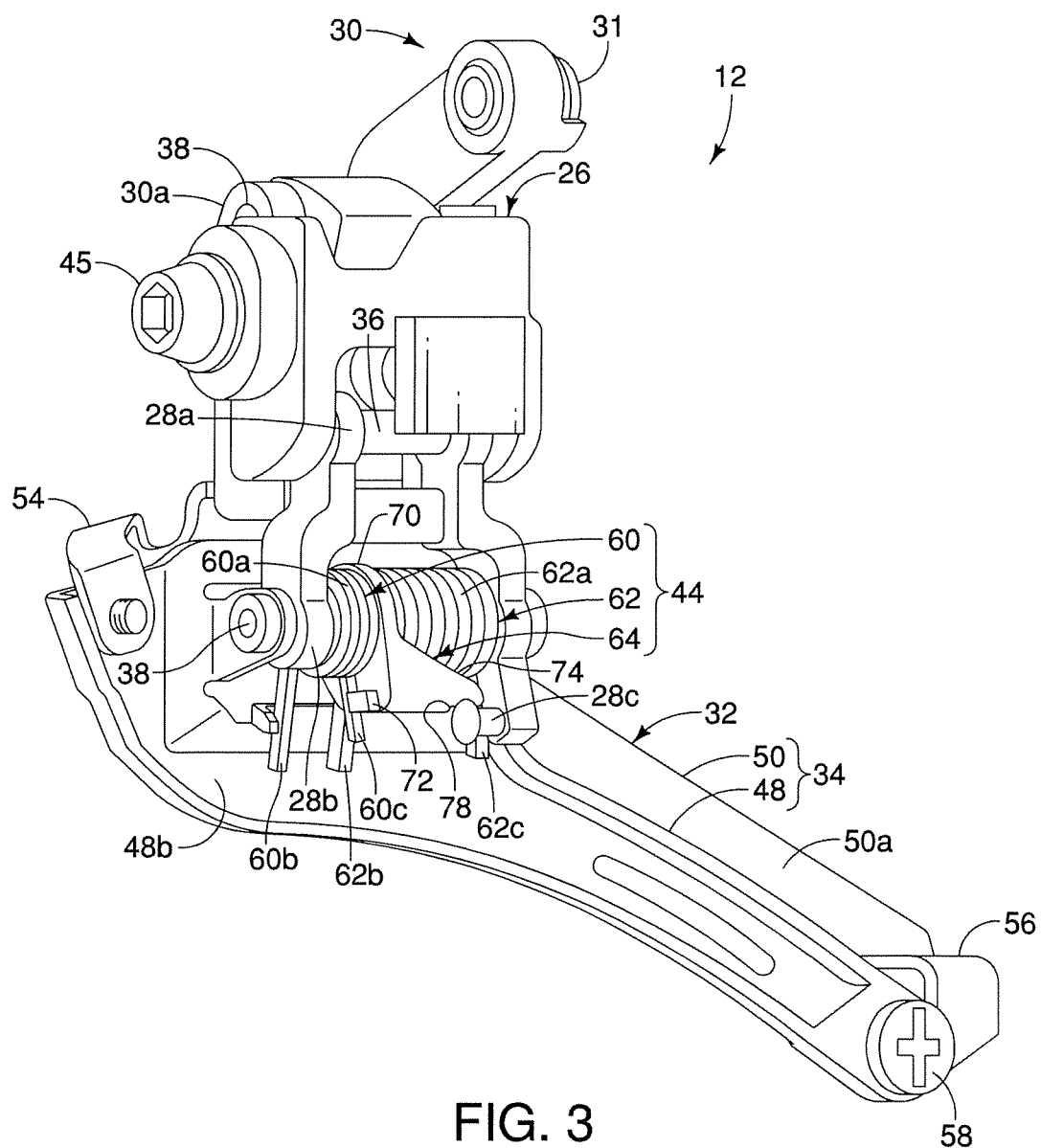
FIG. 3 is an inside perspective view of the front derailleur illustrated in FIGS. 1 and 2.
Figure 4:
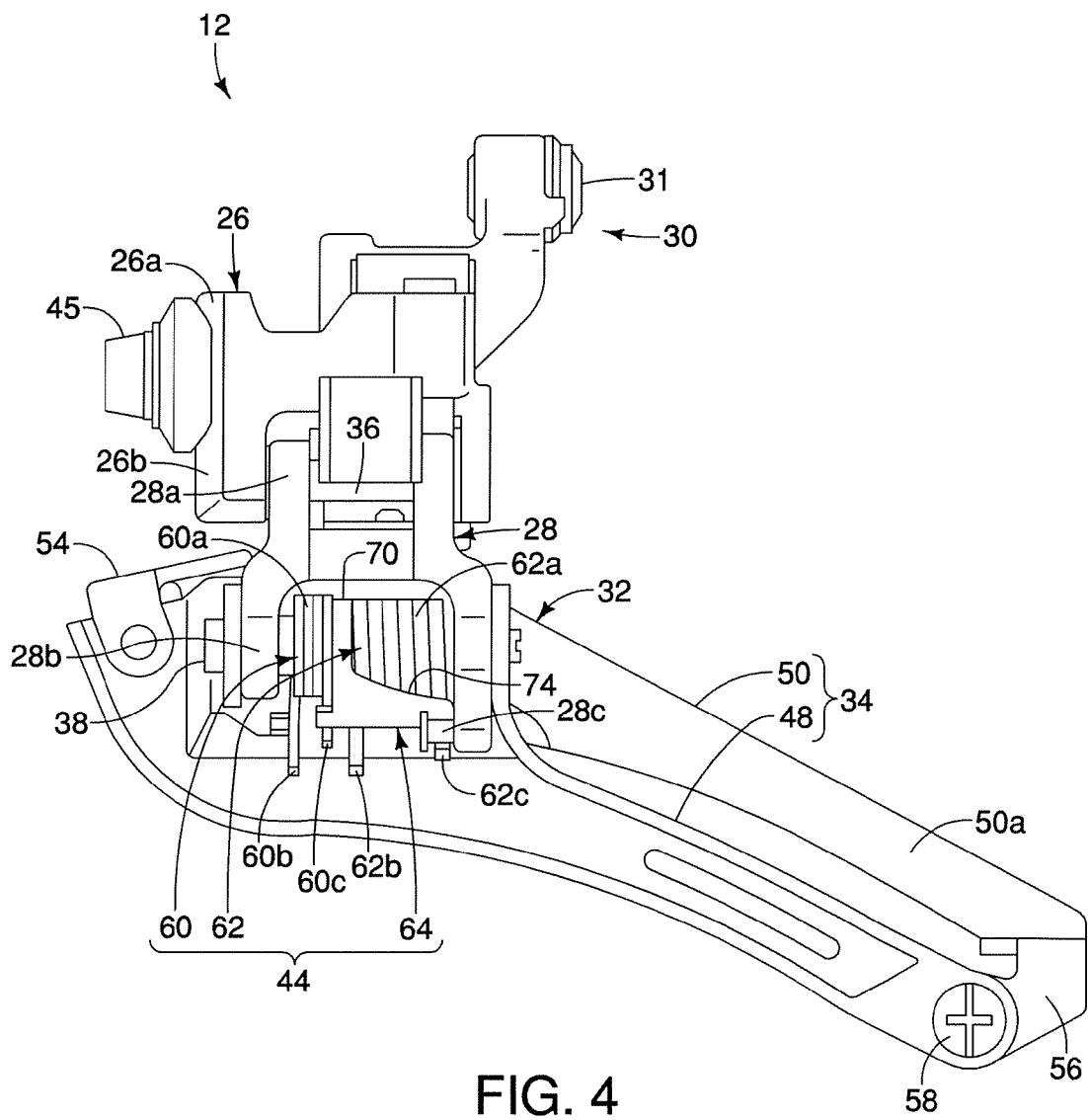
FIG. 4 is an inside elevational view of the front derailleur illustrated in FIGS. 1 to 3.

Referring initially to FIG. 1, a bicycle frame 10 is illustrated that is equipped with a bicycle front derailleur 12 in accordance with a first embodiment. The front derailleur 12 moves a bicycle chain (not shown) in a transverse direction with respect to a crankset 14 having a small chain ring 18 and a large chain ring 20. The front derailleur 12 is a cable operated derailleur that is operated in response to a wire or cable 22 being selectively pulled and released in a conventional manner by a shifter (not shown). The front derailleur 12 is designed to shift a bicycle chain (not shown) between the small chain ring 18 and the large chain ring 20 depending on whether the cable 22 is pulled or released. In the first illustrated embodiment, with the bicycle chain being maintained on the small chain ring 18, the front derailleur 12 shifts the bicycle chain from the small chain ring 18 to the large chain ring 20 in response to the cable 22 being pulled. On the other hand, in the first illustrated embodiment, with the bicycle chain being maintained on the large chain ring 20, the front derailleur 12 shifts the bicycle chain from the large chain ring 20 to the small chain ring 18 in response to the cable 22 being released.

As shown in FIGS. 2 to 6, the bicycle front derailleur 12 basically includes a base member 26, an inner link member 28, an outer link member 30 and a movable member 32. In the first illustrated embodiment, the movable member 32 preferably includes a chain guide 34. Basically, the base member 26 is fixedly mounted to the bicycle frame 10 in a conventional manner, while the movable member 32 is movably supported to the base member 26 by the link members 28 and 30 for movement between a first or retracted position (FIG. 5) and a second or extended position (FIG. 6) respect to the base member 26. In particular, the inner link member 28 is pivotally mounted to the base member 26 via a first pivot pin or axle 36. The inner link member 28 is pivotally mounted to the movable member 32 via a second pivot pin or axle 38. The outer link member 30 is pivotally mounted to the base member 26 via a third pivot pin or axle 40. The outer link member 30 is pivotally mounted to the movable member 32 via a fourth pivot pin or axle 42.

In the first illustrated embodiment, the cable 22 is connected to the outer link member 30 for applying an operating force or torque thereto in order to move the movable member 32 with the chain guide 34 between the first or retracted position and the second or extended position relative to the base member 26. In other words, the chain guide 34 of the movable member 32 is moved relative to the base member 26 by pulling and/or releasing the cable 22 that is operatively coupled between the shifter and the outer link member 30 of the front derailleur 12 for selectively positioning the bicycle chain over one of the chain rings 18 and 20.

In the first illustrated embodiment, the movable member 32 is biased in a given or first direction D1 relative to the base member 26 by a biasing arrangement 44. Thus, the biasing arrangement 44 is operatively disposed between the base member 26 and the movable member 32 such that the biasing arrangement 44 biases the movable member 32 towards the first direction D1 and maintains the movable member 32 in the first or retracted position over the small chain ring 18. In the first illustrated embodiment, the given or first direction D1 is a direction extending towards a center longitudinal plane P of the bicycle frame 10. Also in the first illustrated embodiment, the first or retracted position (FIG. 5) constitutes an initial state or rest position of the movable member 32, since the biasing arrangement 44 maintains the movable member 32 in the first or retracted position over the small chain ring 18 when the cable 22 is released or detached from the bicycle front derailleur 12. Thus, the rest position of the movable member 32 refers to a position in which the movable member 32 is maintained when the cable 22 is released or detached from the bicycle front derailleur 12.

In the first illustrated embodiment, the biasing arrangement 44 and the link members 28 and 30 are arranged with respect to the base member 26 and the chain guide 34 to form a bottom pull arrangement and a down swing arrangement. The bottom pull arrangement refers to the cable 22 being pulled in a downward direction to move the chain guide 34 against the biasing force of the biasing arrangement 44 while the bicycle frame 10 is in a level, upright position. The cable 22 is often routed across the top or along a bottom of a bottom bracket shell of the the bicycle frame 10 on a cable guide, which redirects the cable 22 up along a lower edge of a down tube of the the bicycle frame 10 to the shifter in a conventional manner. The down swing arrangement refers to the chain guide 34 being mounted to a bottom of a four-bar linkage formed by the pivotal connections of the link members 28 and 30 between the base member 26 and the movable member 32 that carries the chain guide 34. Thus, in the first illustrated embodiment, the front derailleur 12 is a bottom pull-bottom swing derailleur. However, the biasing arrangement 44 can be used with a derailleur having a top pull arrangement and/or a top swing derailleur as needed and/or desired.

Figure 7:
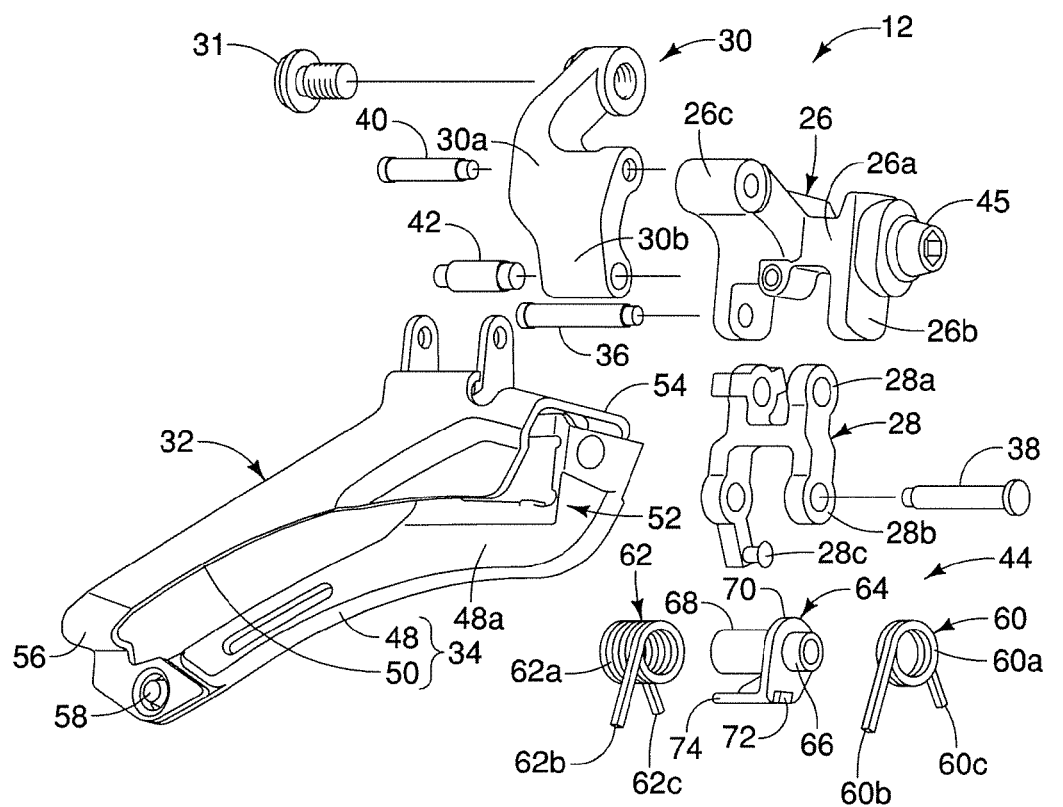
FIG. 7 is an exploded perspective view of the front derailleur illustrated in FIGS. 1 to 6.

As best seen in FIG. 7, the base member 26 includes a bicycle mounting portion 26a, an inner link mounting portion 26b and an outer link mounting portion 26c. The bicycle mounting portion 26a is configured to be coupled to a bracket on a seat tube of the bicycle frame 10 by a mounting screw 45 that is threaded into a threaded hole of the bicycle mounting portion 26a as shown in FIG. 1. While the base member 26 is illustrated as a "braze-on type" of mounting structure, the base member 26 is not limited to this type of mounting structure. For example, the base member 26 of the bicycle front derailleur 12 can be replaced with a base member of a "clamp band type" if needed and/or desired. The inner link mounting portion 26b pivotally supports a first or upper connecting portion 28a of the inner link member 28 via the first axle 36. The outer link mounting portion 26c pivotally supports a first or upper connecting portion 30a of the outer link member 30 via the third axle 40.

Preferably, the base member 26 includes first and second (e.g., low and top) limit screws (not shown) that finely adjust the top and low positions of the chain guide 34. In other words, first and second limit screws are configured and arranged to change the first (low) position of the chain guide 34 relative to the base member 26 the second (top) position of the chain guide 34 relative to the base member 26. The limit screws are conventional and thus, they will not be illustrated herein.

Figure 5:
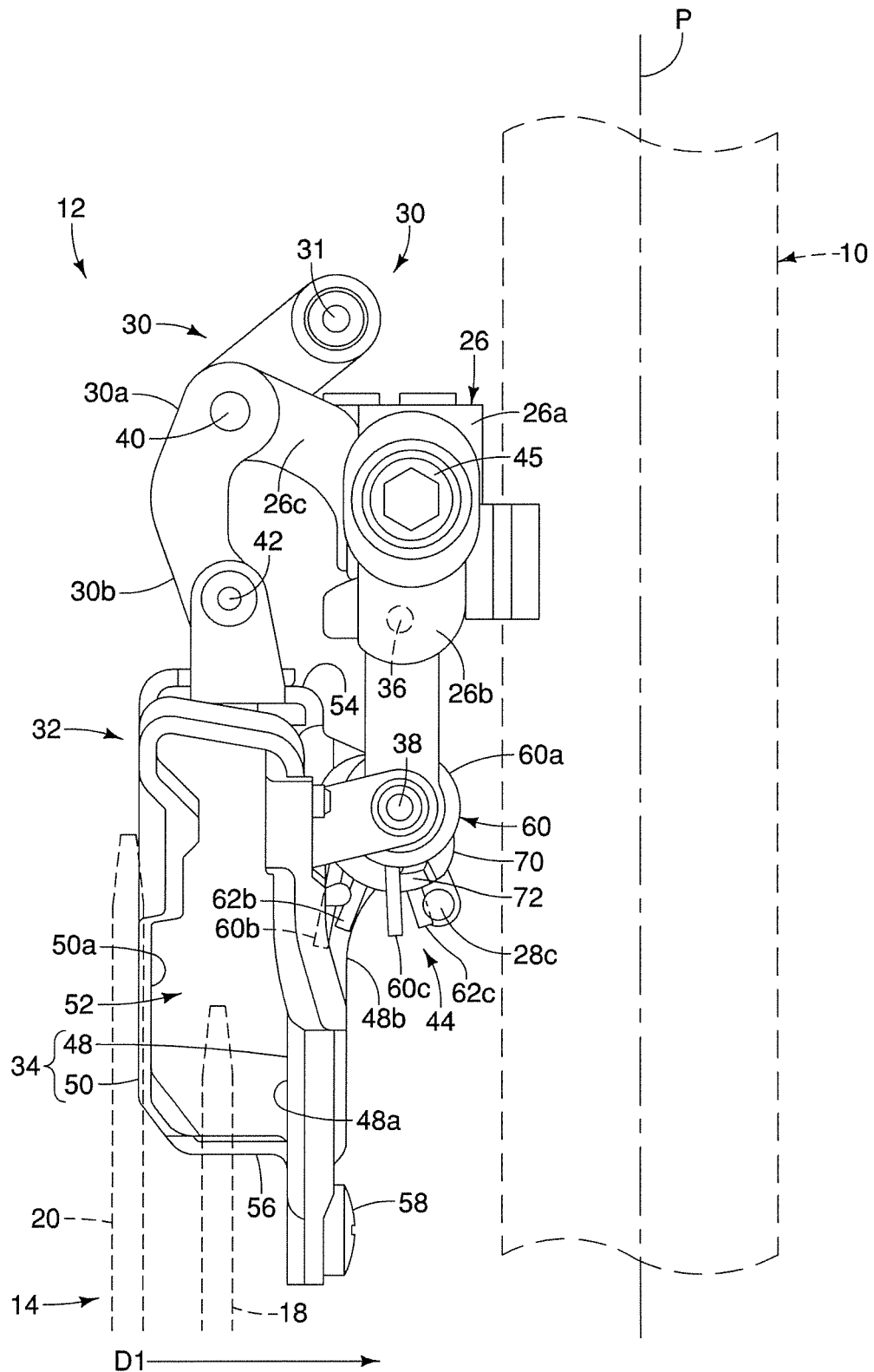
FIG. 5 is a front elevational view of the front derailleur illustrated in FIGS. 1 to 4, with the front derailleur in a first (retracted) position with respect to the bicycle frame.
Figure 6:
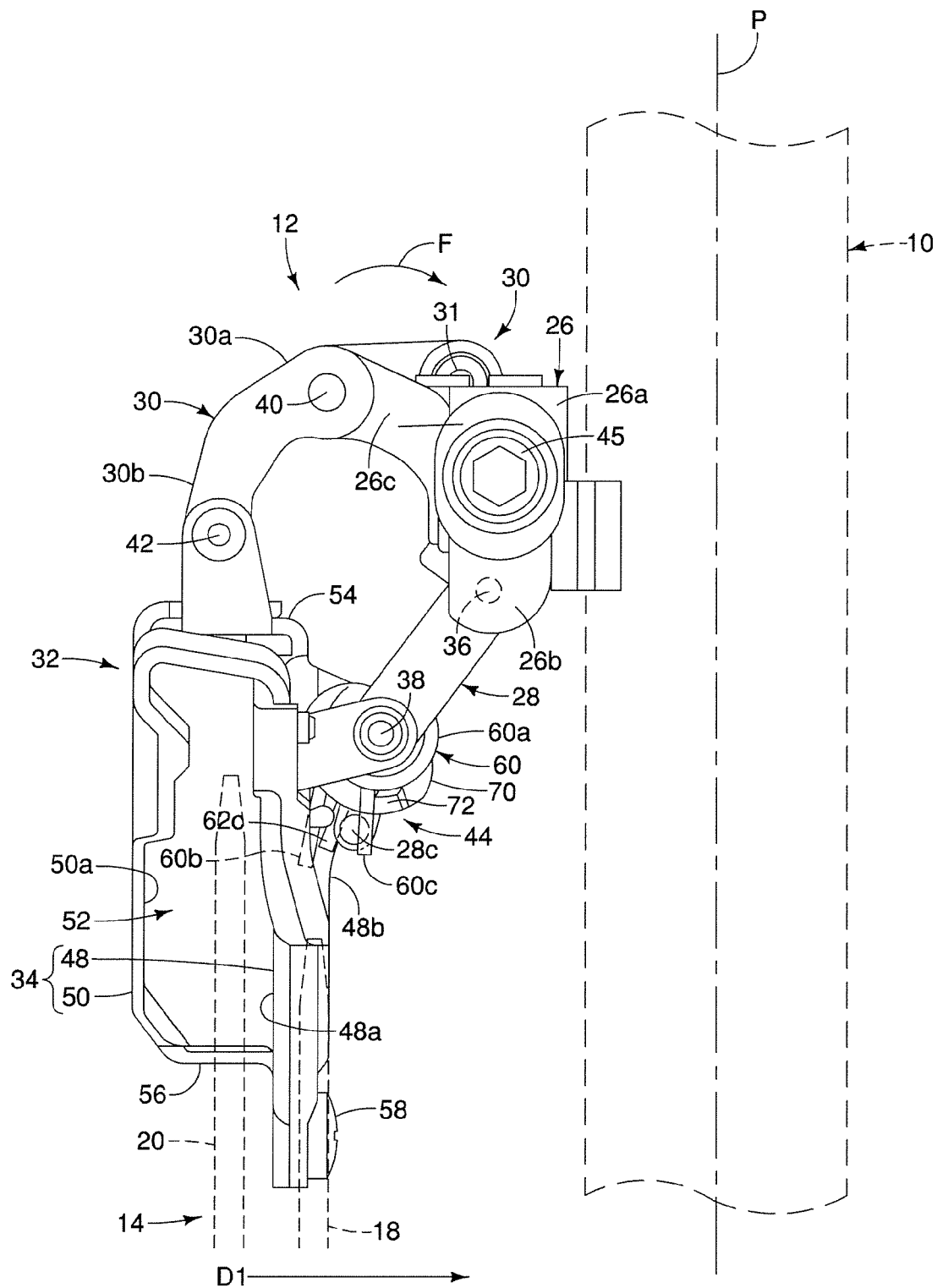
FIG. 6 is a front elevational view of the front derailleur illustrated in FIGS. 1 to 5, with the front derailleur in a second (extended) position with respect to the bicycle frame.

As mentioned above, the inner and outer link members 28 and 30 pivotally mounted to the movable member 32 by the second and fourth axles 38 and 42. In particular, the inner link member 28 has a second or lower connecting portion 28b that receives the second axle 38 to pivotally support the movable member 32, which includes the chain guide 34. The outer link member 30 has a second or lower connecting portion 30b that receives the fourth axle 42 to pivotally support the movable member 32, which includes the chain guide 34. The first and second axles 36 and 38 are parallel to the third and fourth axles 40 and 42. Thus, the link members 28 and 30 are pivotally attached between the base member 26 and the movable member 32 to form a four-bar linkage. Thus, the chain guide 34 of the movable member 32 is movably supported to the base member 26 by the link members 28 and 30 between a retracted or first position and an extended or second position respect to the base member 26. In the first illustrated embodiment, the first position is a low position in which the chain guide 34 is positioned over the small chain ring 18 as seen in FIG. 5, while the second position is a top position in which the chain guide 34 is positioned over the large chain ring 20 as seen in FIG. 6.

In the first illustrated embodiment, the outer link member 30 also includes a cable connector 31 for connection to the cable 22 as seen in FIG. 1. When the outer link member 30 is pulled or released by movement of the cable 22, the chain guide 34 is moved between the retracted (first or low) position and the extended (second or top) position for moving the bicycle chain between the chain rings 18 and 20. While the cable connector 31 is illustrated as a bolt, other suitable cable connector can be used such as, for example, a wire clamp.

In the first illustrated embodiment, the chain guide 34 of the movable member 32 includes a first guide plate 48 and a second guide plate 50. The first and second guide plates 48 and 50 form a chain receiving slot 52 therebetween. The first guide plate 48 is connected to the second guide plate 50 by a first or upper connecting portion 54 and a second or rear-end connecting portion 56. The first guide plate 48, the second guide plate 50, the first connecting portion 54 and the second connecting portion 56 are formed as a one-piece, unitary member. The second connecting portion 56 is attached to the second guide plate 50 by a fastener 58 (e.g., a bolt or a rivet). The first guide plate 48 has a first inner surface 48a for contacting and laterally shifting the bicycle chain such that the bicycle chain moves in an outward direction with respect to the bicycle frame 10 from the small chain ring 18 to the large chain ring 20. Similarly, the second guide plate 50 has a second inner surface 50a for contacting and laterally shifting the bicycle chain such that the bicycle chain moves in an inward direction with respect to the bicycle frame 10 from the large chain ring 20 to the small chain ring 18. The first and second inner surfaces 48a and 50a of the first and second guide plates 48 and 50 face each other to define the chain receiving slot 52 therebetween.

Turning now to FIGS. 7 to 15, the biasing arrangement 44 will now be discussed in more detail. As mentioned above, the biasing arrangement 44 operatively is disposed between the base member 26 and the movable member 32 such that the biasing arrangement 44 biases the movable member 32 and its chain guide 34 towards the first direction D1 to maintain the movable member 32 and its chain guide 34 in the first (retracted or low) position. In the first illustrated embodiment, the biasing arrangement 44 includes a first biasing member 60, a second biasing member 62 and a pre-load body 64. The first biasing member 60, the second biasing member 62 and the pre-load body 64 are mounted on the second axle 38 that pivotally connects the inner link member 28 to the movable member 32.

In the first illustrated embodiment, as explained below, the first biasing member 60 applies a first biasing force that biases the movable member 32 and its chain guide 34 towards the first direction D1 at least while the movable member 32 and its chain guide 34 are in the first (retracted or low) position and during an initial movement of the movable member 32 from the first position to the second (extended or top) position. In the first illustrated embodiment, as explained below, the second biasing member 62 applies a second biasing force that biases the movable member 32 and its chain guide 34 towards the first direction D1 only after the link members 28 and 30 partially move the movable member 32 from the first position to the second position. In the first illustrated embodiment, the spring or biasing force of the first biasing member 60 is rather smaller than the spring or biasing force of the second biasing member 62. Thus, the required operating force F that is applied to the outer link member 30 for moving the movable member 32 from the first position to the second position is initially small, and then the required operating force F increases upon engagement of the second biasing member 62 with the chain guide 34 of the movable member 32 after the movable member 32 has partially moved from the first position to the second position.

Referring to FIGS. 7 to 12, the pre-load body 64 basically includes a first cylindrical portion 66, a second cylindrical portion 68 and a flange portion 70 disposed between the first and second cylindrical portions 66 and 68. The first and second cylindrical portions 66 and 68 of the pre-load body 64 are pivotally arranged on the second axle 38. The first cylindrical portion 66 supports the first biasing member 60, while the second cylindrical portion 68 supports the second biasing member 62. The flange portion 70 has a first abutment 72 protruding from its forward facing surface. The flange portion 70 has a curved wall 74 protruding from its rear facing surface. The curved wall 74 has a slot that forms a second abutment 76 and a third abutment 78 formed on its free end.

Figure 8:
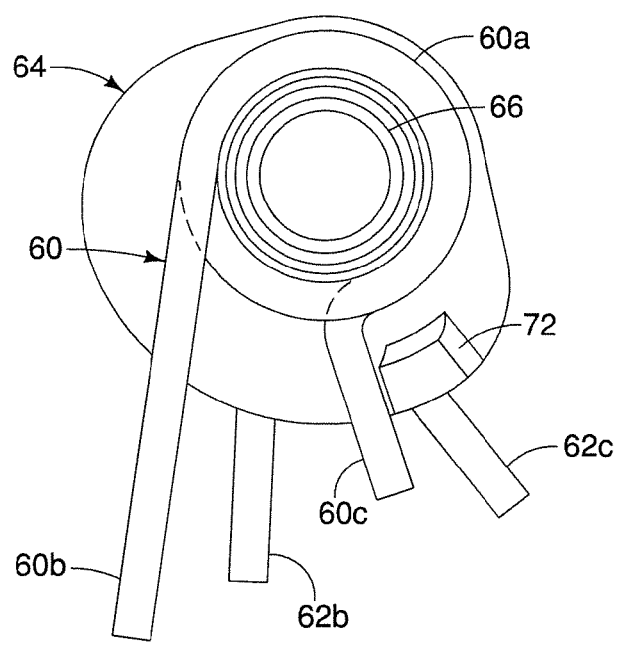
FIG. 8 is a front elevational view of the pre-load body of the front derailleur illustrated in FIGS. 1 to 7 with the first and second biasing members installed thereon.

In the first illustrated embodiment, the first biasing member 60 is a torsion spring that has a coiled portion 60a, a first end 60b and a second end 60c. The first biasing member 60 is installed on the pre-load body 64, which is pivotally mounted on the second axle 38. In particular, as best seen in FIG. 8, the coiled portion 60a is mounted on the first cylindrical portion 66 such that the first biasing member 60 is pivotally arranged on the second axle 38 via the pre-load body 64. The first and second ends 60b and 60c of the first biasing member 60 protrude out of the pre-load body 64. The first end 60b of the first biasing member 60 abuts or contacts a surface 48b of the first guide plate 48 of the chain guide 34. The second end 60c of the first biasing member 60 abuts or contacts a protruding portion or abutment 72 of the pre-load body 64. Thus, the first biasing member 60 biases the pre-load body 64 in a counterclockwise direction on the second axle 38 as viewed axially from the front end of the second axle 38 as seen in FIGS. 5 and 6.

Figure 9:
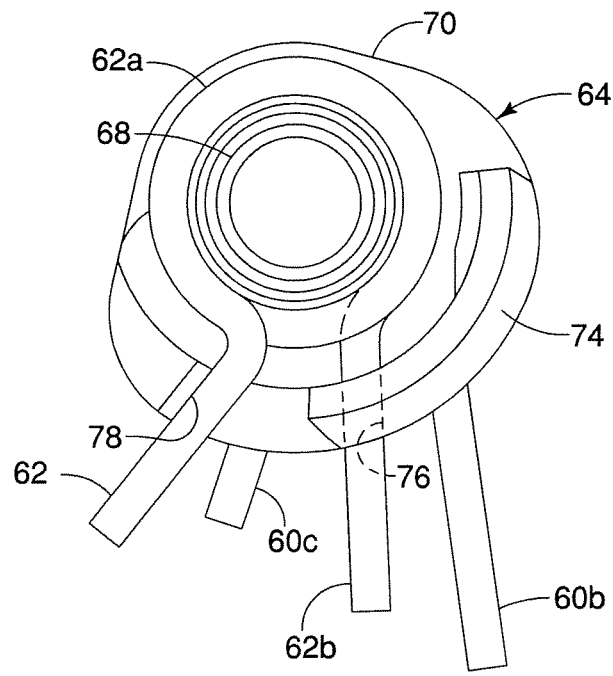
FIG. 9 is a rear elevational view of the pre-load body of the front derailleur illustrated in FIGS. 1 to 7 with the first and second biasing members installed thereon.
Figure 10:
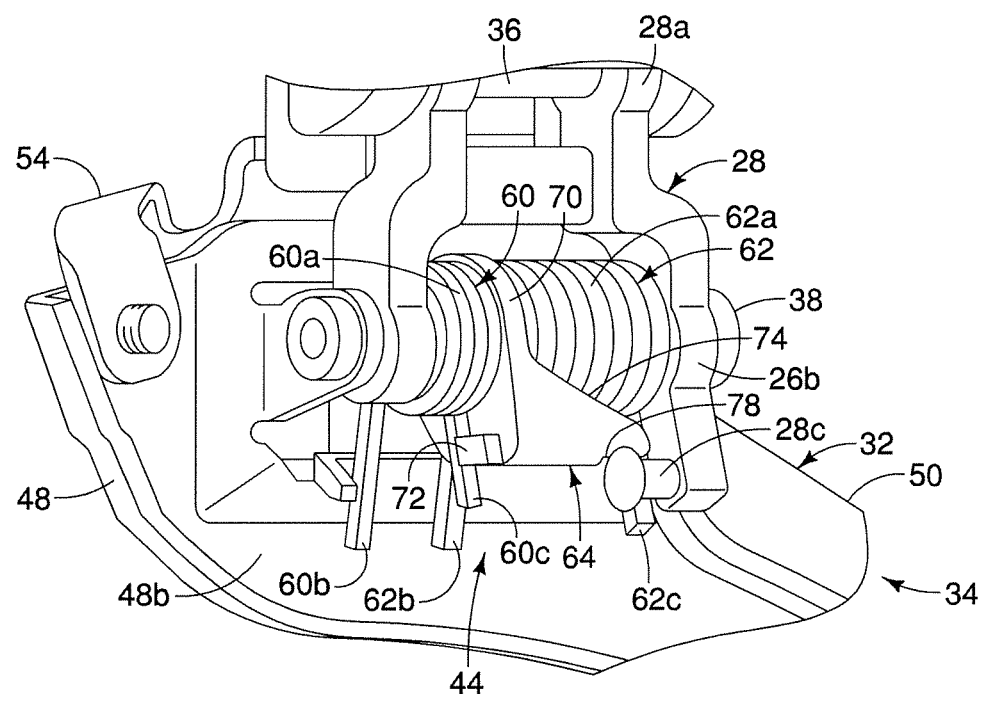
FIG. 10 is a partial perspective view of a portion of the front derailleur illustrated in FIGS. 1 to 7, with the adjustable guide member in the first (retracted) position.
Figure 11:
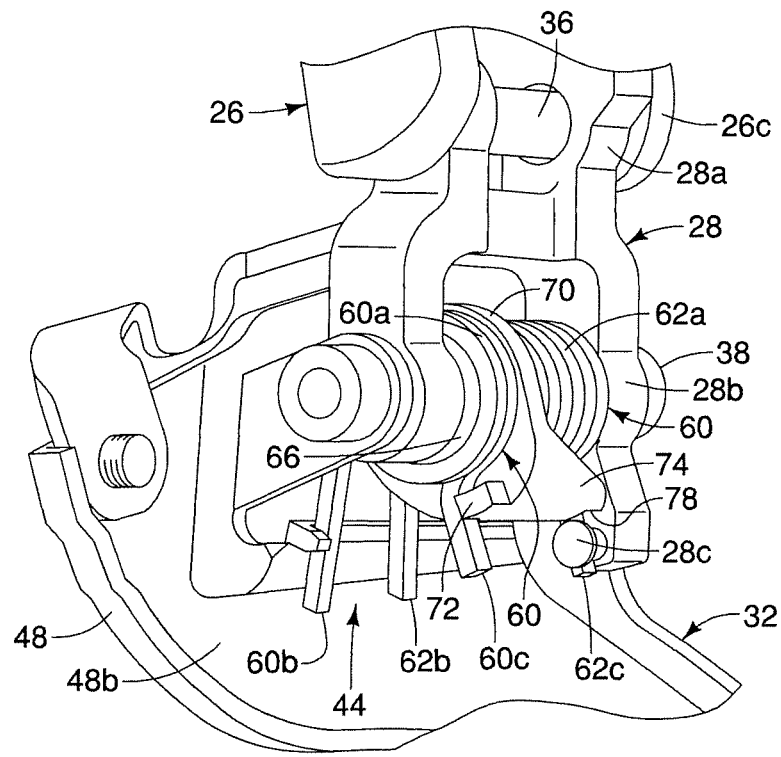
FIG. 11 is a partial perspective view of a portion of the front derailleur illustrated in FIGS. 1 to 7, with the adjustable guide member in a position between the first (retracted) position and the second (extended) position.
Figure 12:
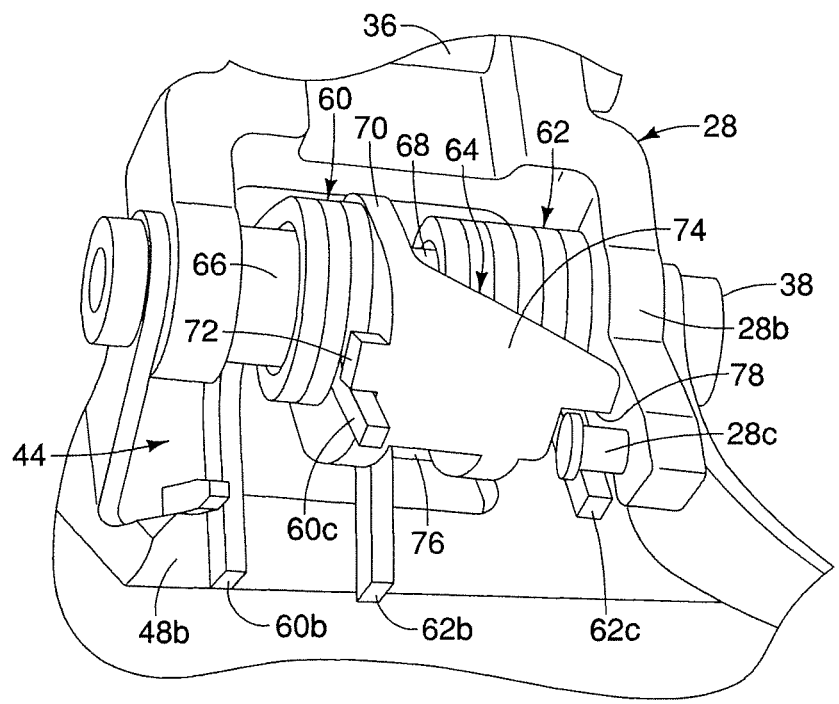
FIG. 12 is a partial perspective view of a portion of the front derailleur illustrated in FIGS. 1 to 7, with the adjustable guide member in the second (extended) position.

In the first illustrated embodiment, the second biasing member 62 is a torsion spring that has a coiled portion 62a, a first end 62b and a second end 62c. The second biasing member 62 is installed on the pre-load body 64, which is pivotally mounted on the second axle 38. In particular, as best seen in FIG. 9, the coiled portion 62a is mounted on the second cylindrical portion 68 such that of the second biasing member 62 is pivotally arranged on the second axle 38 via the pre-load body 64. The first and second ends 62b and 62c of the second biasing member 62 contact the pre-load body 64 such that the second biasing member 62 is supported in a loaded state by the pre-load body 64 at least while the movable member 32 and its chain guide 34 are in the first position. In other words, the second biasing member 62 is disposed on the pre-load body 64 such that the second biasing member 62 has a pre-load tension due to the first and second ends 62b and 62c abutting against the pre-load body 64.

The first and second ends 62b and 62c of the second biasing member 62 also protrude out of the pre-load body 64 so that the second biasing member 62 and the pre-load body 64 effectively move together as a unit on the second axle 38. The first end 62b of the second biasing member 62 is disposed in the slot of the curved wall 74 and abuts the second abutment 76 of the curved wall 74. The free end of the first end 62b of the second biasing member 62 is disposed freely with respect to the movable member 32 while the movable member 32 and its chain guide 34 are disposed in the first position.

However, when the movable member 32 and its chain guide 34 are being moved from the first position towards the second position, the free end of the first end 62b of the second biasing member 62 abuts or contacts the surface 48b of the first guide plate 48 of the chain guide 34. The second end 62c of the second biasing member 62 abuts or contacts the third abutment 78 of the pre-load body 64. Thus, the pre-load body 64 maintains the second biasing member 62 in a loaded state due to the first end 62b of the second biasing member 62 abutting the second abutment 76 of the pre-load body 64 and the second biasing member 62 abutting the third abutment 78 of the pre-load body 64. The second end 62c of the second biasing member 62 abuts or contacts a first abutment 28c of the inner link member 28. In particular, the first biasing member 60 biases the pre-load body 64 and the second biasing member 62 such that the second end 62c of the second biasing member 62 abuts the first abutment 28c of the inner link member 28 and the free end of the first end 62b of the second biasing member 62 is spaced from the chain guide 34. Thus, while the movable member 32 and its chain guide 34 are in the first position, the free end of the second end 62c of the second biasing member 62 is biased against the inner link member 28 such that only the first biasing member 60 biases the movable member 32 and its chain guide 34 toward the first direction D1. The second end 62c of the second biasing member 62 always remains in contact with the first abutment 28c of the inner link member 28 for the full range of movement of the movable member 32 between the first (retracted or low) position and the second (extended or top) position.

On the other hand, the first end 62b of the second biasing member 62 only contacts the movable member 32 and its chain guide 34 after the movable member 32 and its chain guide 34 has been moved a prescribed distance from the first (retracted or low) position to an intermediate position in-between the first (retracted or low) position and the second (extended or top) position. Once the movable member 32 and its chain guide 34 has been moved the prescribed distance and reaches the intermediate position, the first end 62b of the second biasing member 62 abuts against the surface 48b of the first guide plate 48 of the chain guide 34. Thus, the second biasing member 62 starts biasing the movable member 32 and its chain guide 34 toward the first direction D1 as the movable member 32 and its chain guide 34 are moved from the intermediate position to the second (extended or top) position. During this range of movement of the movable member 32 and its chain guide 34 from the intermediate position to the second (extended or top) position, the first biasing member 60 stops applying biasing force to the movable member 32 and its chain guide 34 toward the first direction D1.

Figure 13:
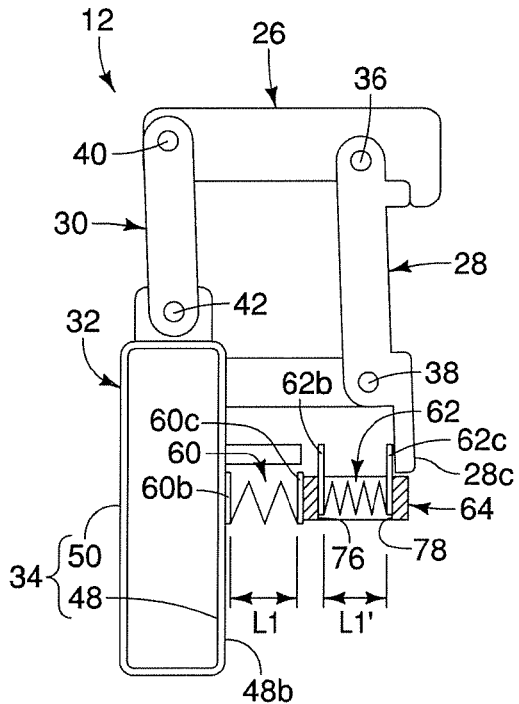
FIG. 13 is a schematic illustration of the front derailleur illustrated in FIGS. 1 to 7 with the movable member and its chain guide in the first (retracted) position.
Figure 14:
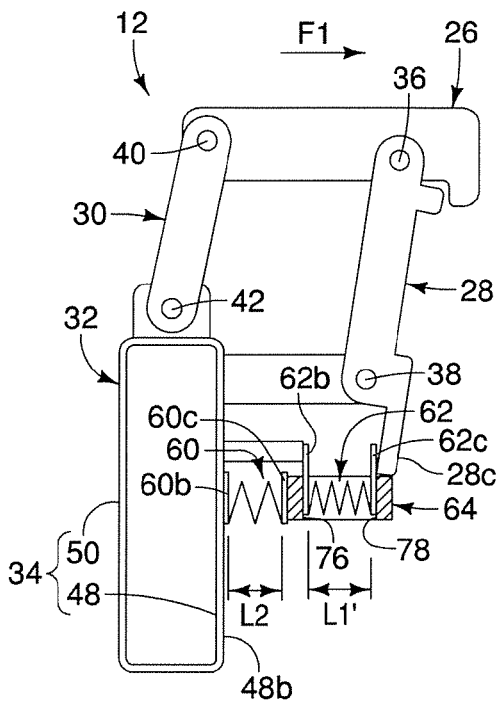
FIG. 14 is a schematic illustration of the front derailleur illustrated in FIGS. 1 to 7 with the movable member and its chain guide in a position between the first (retracted) position and the second (extended) position.
Figure 15:
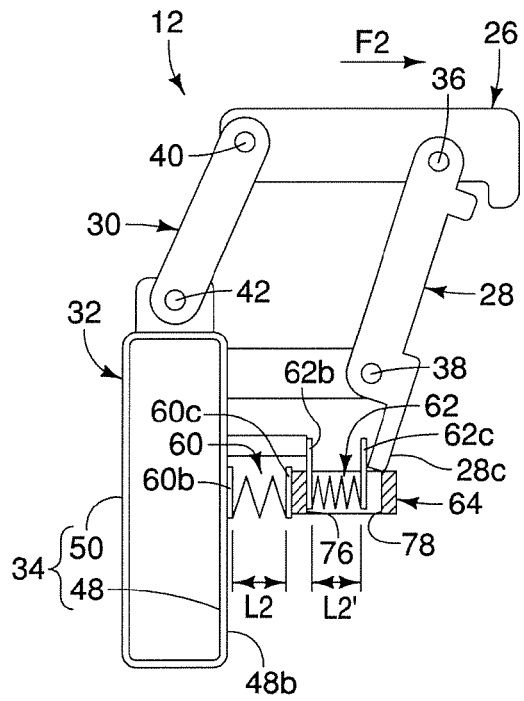
FIG. 15 is a schematic illustration of the front derailleur illustrated in FIGS. 1 to 7 with the movable member and its chain guide in the second (extended) position.
Figure 16:
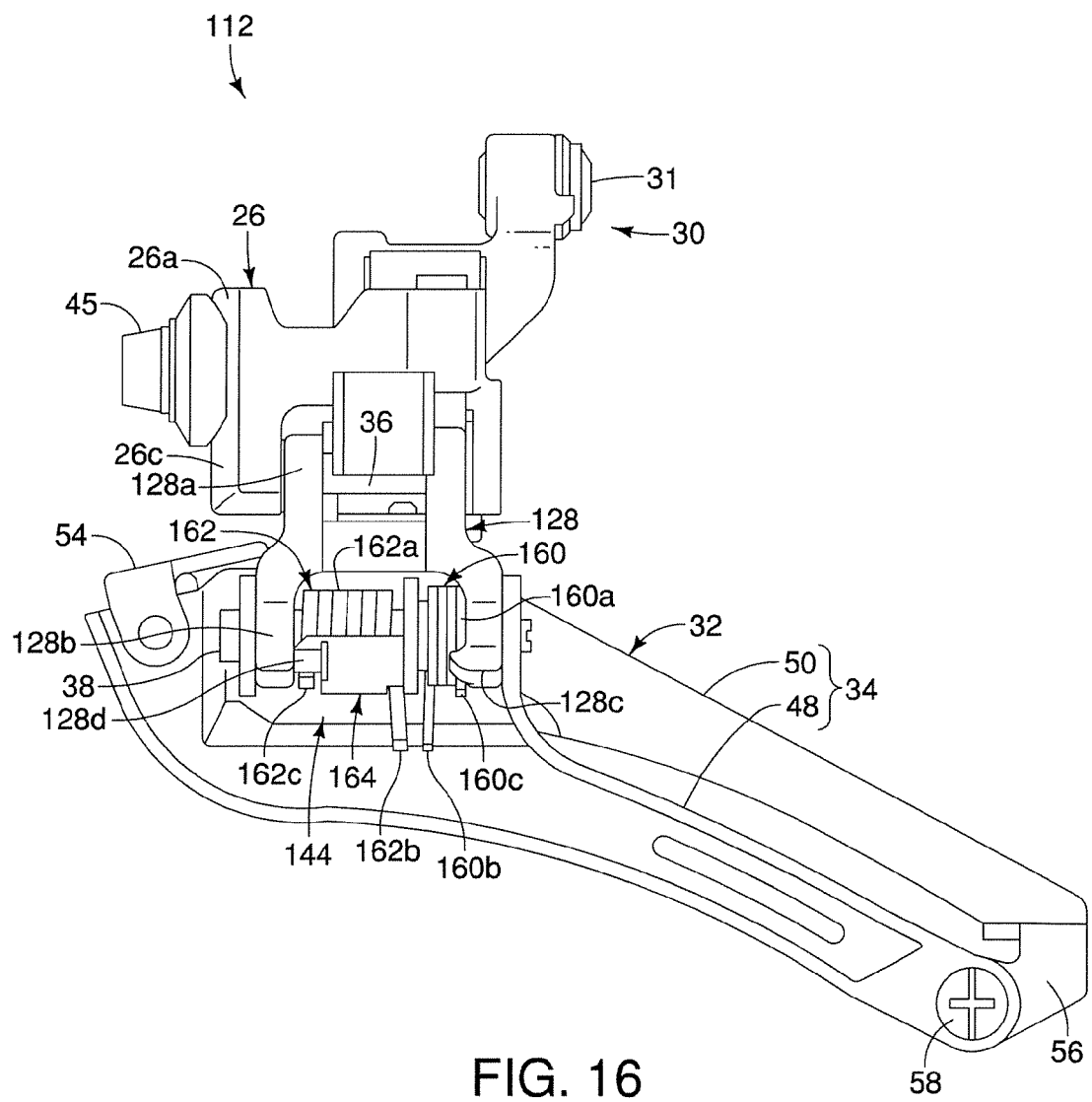
FIG. 16 is an inside elevational view of a bicycle front derailleur in accordance with a second illustrated embodiment.

Turning now to FIGS. 13 to 15, the biasing force of the biasing arrangement 44 will be explained using the schematic illustrations of the front derailleur 12. In the first (retracted or low) position of FIG. 13, the movable member 32 and its chain guide 34 are solely biased towards the first direction D1 by the first biasing force of the first biasing member 60. The second biasing member 62 is effectively disconnected by the pre-load body 64 such that no biasing force is applied by the second biasing member 62 to move the movable member 32 and its chain guide 34 towards the first direction D1. However, as seen in FIG. 13, the first biasing force of the first biasing member 60 is transmitted through the pre-load body 64 and the second biasing member 62 to the first abutment 28c of the inner link member 28. In particular, the first end 60b of the first biasing member 60 contacts the surface 48b of the first guide plate 48 of the chain guide 34 and the second end 60c of the first biasing member 60 contacts the abutment 72 of the pre-load body 64 such that the first biasing force of the first biasing member 60 is transmitted to the pre-load body 64. Since the second biasing member 62 is non-movable with respect to the pre-load body 64, the first biasing force of the first biasing member 60 is also transmitted to the second biasing member 62. Since the second end 62c of the second biasing member 62 abuts the first abutment 28c of the inner link member 28, the first biasing force of the first biasing member 60 is transmitted to the inner link member 28.

As seen in FIG. 14, when a first required operating force F1 is applied to the outer link member 30, the movable member 32 and its chain guide 34 initially start moving from the first (retracted or low) position towards the second (extended or top) position. This initial movement results in the first biasing member 60 being further loaded (i.e., twisted in the case of a torsion spring, compressed in the case of a compression spring and stretched in the case of a tension spring). This further loading of the first biasing member 60 is schematically illustrated by the axial length of the first biasing member 60 becoming shorter (e.g., from a length L1 in FIG. 13 to a length L2 in FIG. 14). As seen in FIG. 14, at a point in-between the first position and the second position, the first end 62b of the second biasing member 62 abuts or contacts the surface 48b of the first guide plate 48 of the chain guide 34.

Now turning to FIG. 15, a second required operating force F2 is applied to the outer link member 30 to complete the shift from the first (retracted or low) position to the second (extended or top) position. The second required operating force F2 is higher than the first required operating force F1 because the second biasing member 62 is now engaged and the first biasing member 60 is effectively disconnected. In particular, upon the second required operating force F2 being applied to the outer link member 30, the movable member 32 and its chain guide 34 move further towards the second position in response to further movement of the inner and outer link members 28 and 30. This further movement of the inner and outer link members 28 and 30 causes the further loading of the second biasing member 62, which is schematically illustrated by the axial length of the second biasing member 62 becoming shorter (e.g., from a length L1 in FIGS. 13 and 14 to a length L2' in FIG. 15). In particular, the first and second ends 62b and 62c of the second biasing member 62 are moved towards each to further load the second biasing member 62 as the movable member 32 and its chain guide 34 move further towards the second position as seen in FIG. 15. At the same time, the second end 62c of the second biasing member 62 moves away from the third abutment 78 of the pre-load body 64. This relative movement between the second end 62c of the second biasing member 62 and the third abutment 78 of the pre-load body 64 results in the first biasing member 60 from being effectively disconnected, i.e. the first biasing member 60 stops applying biasing force to the movable member 32. Because the biasing force of the first biasing member 60 is rather smaller than the biasing force of the second biasing member 62, the first required operating force F1 is initially small for moving the chain guide 34 from the first position to the intermediate position, and then, the required operating force increases from the first required operating force F1 to the second required operating force F2 upon engagement of the second biasing member 62 with the chain guide 34 for completing the shift from the intermediate position to the second position. Thus, the biasing force of the biasing arrangement 44 is smaller during an early range of a movement range of the movable member 32 as the movable member 32 moves from the first position to the second position.

Referring now to FIGS. 16 to 21, a front derailleur 112 is illustrated in accordance with a second embodiment. The front derailleur 112 is identical to the front derailleur 12, except that the inner link member 28 and the biasing arrangement 44 have been replaced with an inner link member 128 and a biasing arrangement 144. The biasing arrangement 144 includes a first biasing member 160, a second biasing member 162 and a pre-load body 164. In view of the similarity of between the front derailleurs 12 and 112, the parts of the front derailleur 112 that are identical to the front derailleur 12 will be given the same reference numbers. Moreover, the following description of the front derailleur 112 will focus on the differences between the front derailleurs 12 and 112.

In the front derailleur 112, similar to the front derailleur 12, the first and second biasing members 160 and 162 and the pre-load body 164 are arranged so that only the first biasing member 160 applies a biasing force to the movable member 32 and its chain guide 34 towards the first direction D1 during a first range of movement of the movable member 32 and its chain guide 34 from the first (retracted or low) position to the intermediate position. However, unlike the front derailleur 12, the first and second biasing members 160 and 162 and the pre-load body 164 of the front derailleur 112 arranged so that both of the first and second biasing members 160 and 162 apply a biasing force to the movable member 32 and its chain guide 34 towards the first direction D1 during a second range of movement of the movable member 32 and its chain guide 34 from the intermediate position to the second (extended or top) position.

The pre-load body 164 basically includes a first cylindrical portion 166, a second cylindrical portion 168 and a flange portion 170 disposed between the first and second cylindrical portions 166 and 168. The first and second cylindrical portions 166 and 168 of the pre-load body 64 are pivotally arranged on the second axle 38. The first cylindrical portion 166 supports the first biasing member 160, while the second cylindrical portion 168 supports the second biasing member 162. The flange portion 170 has a curved wall 174. The curved wall 174 has a slot that forms a second abutment 176 adjacent the flange portion 170 and a third abutment 178 formed on its free end, which is spaced from the flange portion 170.

In the second illustrated embodiment, the inner link member 128 has a first or upper connecting portion 128a and a second or lower connecting portion 128b. The first or upper connecting portion 128a receives the first axle 36 to pivotally support the inner link member 128 to the base member 26. The second or lower connecting portion 128b receives the second axle 38 to pivotally support the movable member 32 and its the chain guide 34 to the inner link member 128.

Figure 17:
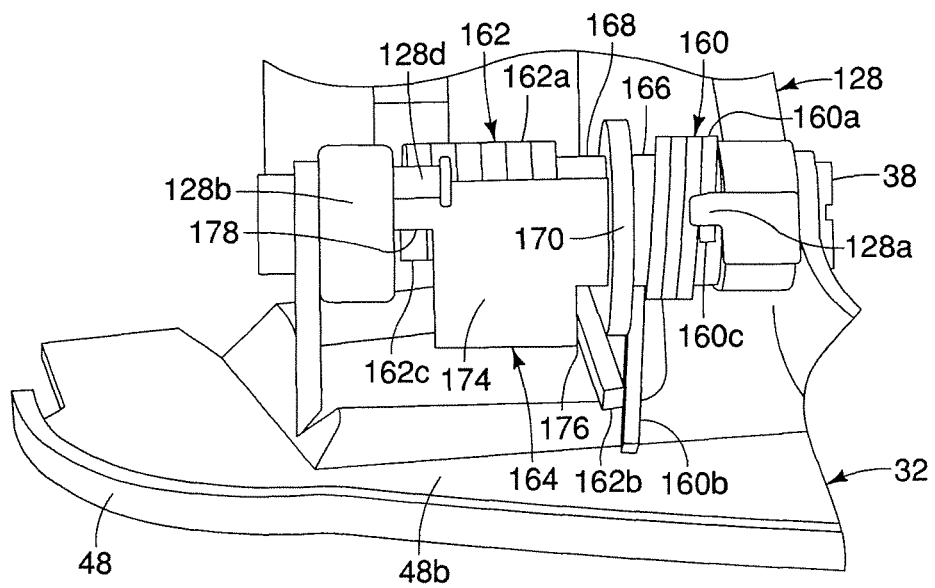
FIG. 17 is an inside perspective view of a portion of the front derailleur illustrated in FIG. 16 with the movable member and its chain guide in the first (retracted) position.
Figure 18:
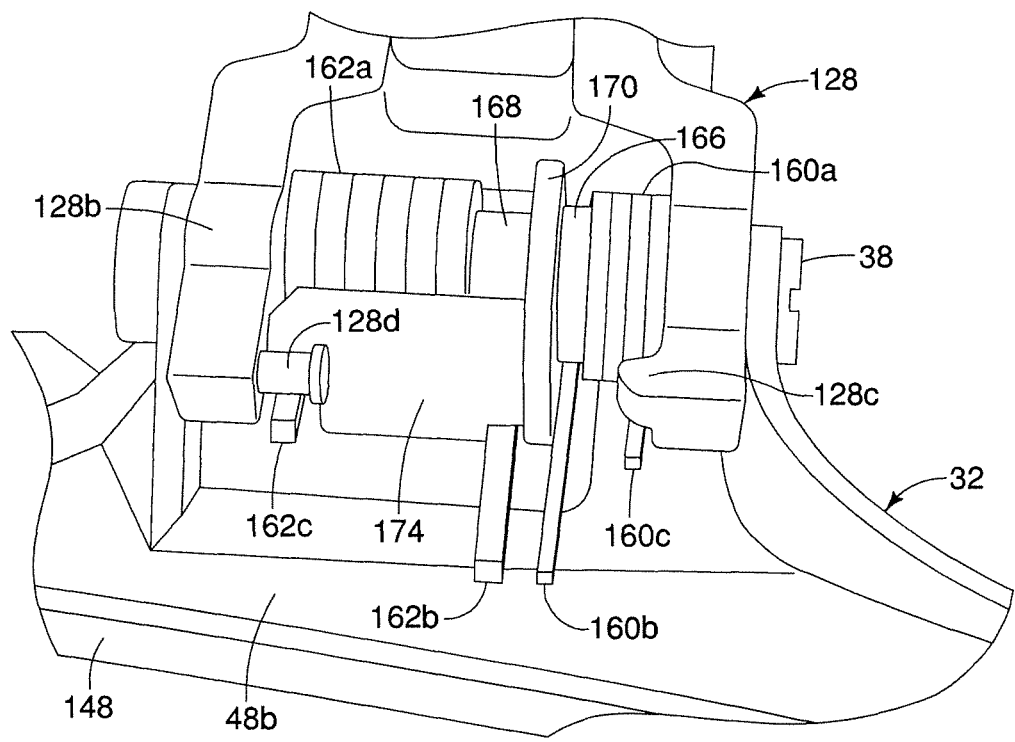
FIG. 18 is an inside perspective view of a portion of the front derailleur illustrated in FIGS. 16 and 17 with the movable member and its chain guide in the first (retracted) position.

The first biasing member 160 is a torsion spring that has a coiled portion 160a, a first end 160b and a second end 160c. The first biasing member 160 is installed on the pre-load body 164, which is pivotally mounted on the second axle 38. In particular, the coiled portion 160a of the first biasing member 160 is pivotally arranged on the second axle 38 via the pre-load body 164. As seen in FIGS. 17 and 18, the first and second ends 160b and 160c of the first biasing member 160 protrude out of the pre-load body 164. The first end 160b of the first biasing member 160 abuts or contacts the surface 48b of the first guide plate 48 of the chain guide 34. The second end 160c of the first biasing member 160 abuts or contacts a first abutment 128c of the inner link member 128. Thus, the first biasing member 160 applies a first biasing force between the chain guide 34 and the inner link member 128 to bias the chain guide 34 toward the first direction D1.

In the second illustrated embodiment, the second biasing member 162 is a torsion spring that has a coiled portion 162a, a first end 162b and a second end 162c. The second biasing member 162 is installed on the pre-load body 164, which is pivotally mounted on the second axle 38. In particular, the coiled portion 162a of the second biasing member 162 is pivotally arranged on the second axle 38 via the pre-load body 164. The first and second ends 162b and 162c of the second biasing member 162 contact the second and third abutments 176 and 178 of the pre-load body 164 such that the second biasing member 162 is supported in a loaded state by the pre-load body 164 at least while the movable member 32 and its chain guide 34 are in the first position. In other words, the second biasing member 162 is disposed on the pre-load body 164 such that the second biasing member 162 has a pre-load tension due to the first and second ends 162b and 162c abutting against the second and third abutments 176 and 178 of the pre-load body 164.

As seen in FIG. 17, the first and second ends 162b and 162c are free from contact with a fourth abutment 128d of the inner link member 128 and the surface 48b of the first guide plate 48 of the chain guide 34. In other words, the first and second ends 162b and 162c of the second biasing member 162 are disposed freely with respect to the movable member 32 and the inner link member 128 such that only the first biasing member 160 biases the movable member 32 and its chain guide 34 toward the first direction D1 while the movable member 32 and its chain guide 34 are disposed in the first (retracted or low) position.

As seen in FIG. 18, upon movement of the movable member 32 and its chain guide 34 from the first (retracted or low) position towards the second (extended or top) position, the first end 162b of the second biasing member 162 contacts the fourth abutment 128d of the inner link member 128 and the second end 162c of the second biasing member 162 contacts the surface 48b of the first guide plate 48 of the chain guide 34 such that the second biasing member 162 starts applying the second biasing force to the movable member 32 and its chain guide 34 in conjunction with the first biasing force of the first biasing member 160.

Figure 19:
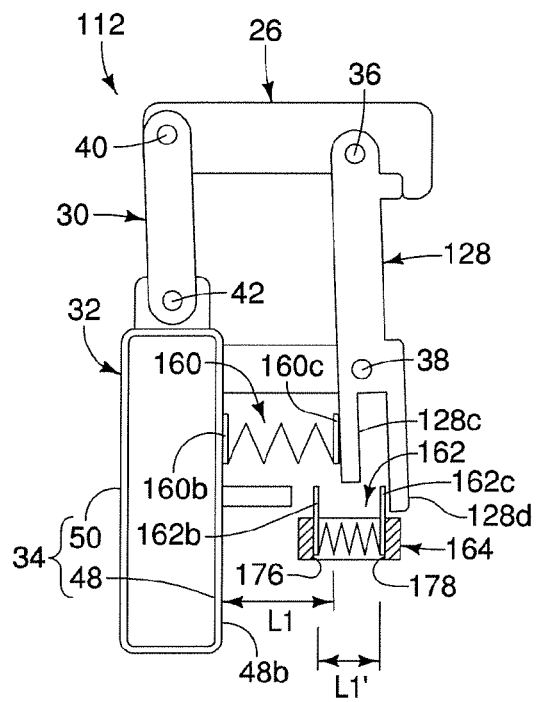
FIG. 19 is a schematic illustration of the front derailleur illustrated in FIGS. 16 to 18 with the movable member and its chain guide in the second (extended) position.
Figure 20:
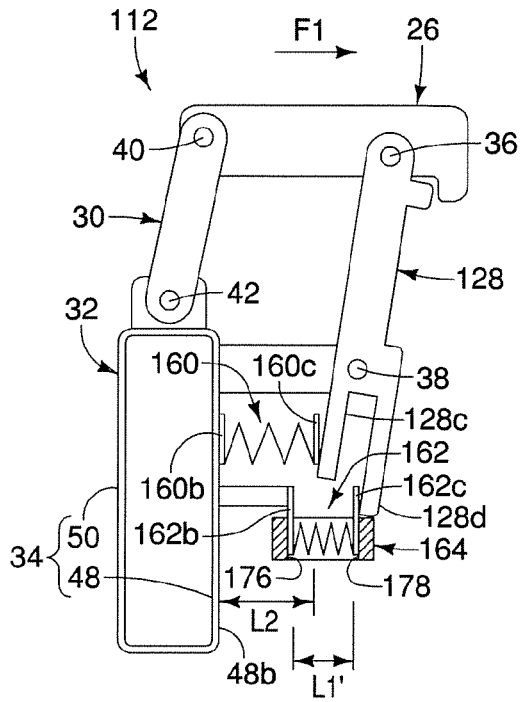
FIG. 20 is a schematic illustration of the front derailleur illustrated in FIGS. 16 to 18 with the movable member and its chain guide in a position between the first (retracted) position and the second (extended) position.

Turning now to FIGS. 19 to 20, the biasing force of the biasing arrangement 144 will be explained using the schematic illustrations of the front derailleur 112. In the first (retracted or low) position of FIG. 19, the movable member 32 and its chain guide 34 are solely biased towards the first direction D1 by the first biasing force of the first biasing member 160. The second biasing member 162 is effectively disconnected by the pre-load body 164 such that no biasing force is applied by the second biasing member 162 to move the movable member 32 and its chain guide 34 towards the first direction D1.

As seen in FIG. 20, when a first required operating force F1 is applied to the outer link member 30, the movable member 32 and its chain guide 34 initially start moving from the first (retracted or low) position towards the second (extended or top) position. This initial movement results in the first biasing member 160 being further loaded (i.e., twisted in the case of a torsion spring, compressed in the case of a compression spring and stretched in the case of a tension spring). This further loading of the first biasing member 160 is schematically illustrated by the axial length of the first biasing member 160 becoming shorter (e.g., from a length L1 in FIG. 19 to a length L2 in FIG. 20). As seen in FIG. 20, at a point in-between the first position and the second position, the first and second ends 162b and 162c of the second biasing member 162 abut or contact the surface 48b of the first guide plate 48 of the chain guide 34 and the abutment 128d of the inner link member 128, respectively.

Figure 21:
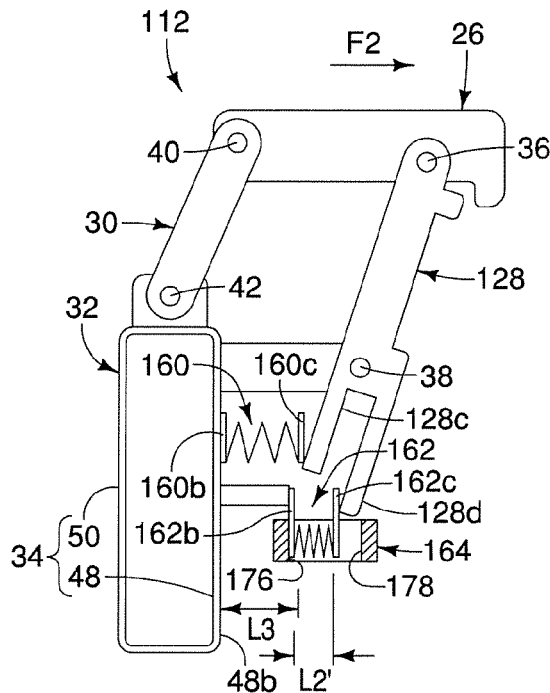
FIG. 21 is a schematic illustration of the front derailleur illustrated in FIGS. 16 to 18 with the movable member and its chain guide in the second (extended) position.

Now turning to FIG. 20, a second required operating force F2 is applied to the outer link member 30 to complete the shift from the first (retracted or low) position to the second (extended or top) position. The second required operating force F2 is higher than the first required operating force F1 because the first and second biasing members 160 and 162 is now both engaged. In particular, upon the second required operating force F2 being applied to the outer link member 30, the movable member 32 and its chain guide 34 move further towards the second position in response to further movement of the inner and outer link members 128 and 30. This further movement of the inner and outer link members 128 and 30 causes the further loading of the second biasing member 162, which is schematically illustrated by the axial length of the second biasing member 162 becoming shorter (e.g., from a length L1' in FIGS. 19 and 20 to a length L2' in FIG. 21 In particular, the first and second ends 162b and 162c of the second biasing member 162 are moved towards each to further load the second biasing member 162 as the movable member 32 and its chain guide 34 move further towards the second position as seen in FIG. 21. At the same time, the first and second ends 160b and 160c of the first biasing member 160 are moved towards each to further load the first biasing member 160 as the movable member 32 and its chain guide 34 move further towards the second position as seen in FIG. 21. This further loading of the first biasing member 160 is schematically illustrated in FIG. 21 by the axial length of the first biasing member 160 becoming shorter (e.g., from a length L2 in FIGS. 20 to a length L3 in FIG. 21 Thus, with the biasing arrangement 144, the first required operating force F1 is initially small for moving the movable member 32 and its chain guide 34 from the first position to the intermediate position in-between the first position and the second position. Then, the required operating force increase from the first required operating force F1 to the second required operating force F2 upon engagement of the second biasing member 162 with the chain guide 34 of the movable member 32 for completing the shift from the intermediate position to the second position. Thus, the biasing force of the biasing arrangement 144 is smaller during an early range of a movement range of the movable member 32 as the movable member 32 moves from the first position to the second position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the following directional terms "forward", "rearward", "front", "rear", "above", "downward", "vertical", "horizontal", "below" and "transverse" as well as any other similar directional terms refer to those directions of a bicycle in an upright, level riding position and equipped with the bicycle front derailleur 12. Accordingly, these directional terms, as utilized to describe the bicycle front derailleur 12 should be interpreted relative to a bicycle in an upright riding position on a horizontal surface and that is equipped with the bicycle front derailleur 12. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be preformed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
    a base member including a bicycle mounting portion;
    a movable member movably supported to the base member between a first position and a second position with respect to the base member;
    a biasing arrangement operatively disposed between the base member and the movable member such that the biasing arrangement biases the movable member towards a first direction and maintains the movable member in the first position, the biasing arrangement including
        a first biasing member applying a first biasing force that biases the movable member towards the first direction at least while the movable member is in the first position,
        a second biasing member applying a second biasing force that biases the movable member towards the first direction, and
        a pre-load body that maintains the second biasing member in a loaded state while the movable member is in the first position, the second biasing member applying the second biasing force on the movable member only after the movable member has moved from the first position towards the second position.

2. The bicycle derailleur according to claim 1, wherein
    the second biasing member is a torsion spring that has a coiled portion, a first end and a second end,
    the first and second ends contacting the pre-load body, the second biasing member being supported in a loaded state by the pre-load body at least while the movable member is in the first position.

3. The bicycle derailleur according to claim 2, wherein
    the pre-load body has a cylindrical portion disposed in the coiled portion of the second biasing member.

4. The bicycle derailleur according to claim 3, further comprising
    a link member having a first connecting portion pivotally connected to the base member by a first axle and a second connecting portion pivotally connected to the movable member by a second axle,
    the coiled portion of the second biasing member and the cylindrical portion of the pre-load body are pivotally arranged on the second axle.

5. The bicycle derailleur according to claim 4, wherein
the first biasing member is a torsion spring that has a coiled portion, a first end and a second end,
the coiled portion of the first biasing member is pivotally arranged on the second axle.

6. The bicycle derailleur according to claim 5, wherein
the first end of the first biasing member contacts the movable member and the second end of the first biasing member contacts the pre-load body, the first end of the second biasing member is disposed freely with respect to the movable member and the second end of the second biasing member is biased against the link member such that only the first biasing member biases the movable member toward the first direction while the movable member is disposed in the first position, and
the first end of the second biasing member contacts the movable member and the second biasing member starts biasing the movable member toward the first direction while the first biasing member stops applying any additional biasing force to the movable member toward the first direction and after the movable member has moved from the first position towards the second position.

7. The bicycle derailleur according to claim 5, wherein
the first end of the first biasing member contacts the movable member, the second end of the first biasing member contacts to the link member, the first and second ends of the second biasing member are disposed freely with respect to the movable member and the link member such that only the first biasing member biases the movable member toward the first direction while the movable member is disposed in the first position, and
the first end of the first biasing member contacts the movable member, the second end of the first biasing member contacts the link member, the first end of the second biasing member contacts the link member and the second end of the second biasing member contacts the movable member such that the second biasing member starts applying the second biasing force to the movable member in conjunction with the first biasing force of the first biasing member after the movable member has moved from the first position towards the second position.

8. The bicycle derailleur according to claim 1, wherein
the bicycle derailleur is a front derailleur.

9. The bicycle derailleur according to claim 1, wherein
the movable member includes a chain guide having a first guide plate having a first inner surface and a second guide plate having a second inner surface, the first and second inner surfaces facing each other to form a chain receiving slot therebetween.

* * * * *